Patented July 12, 1927.

1,635,461

UNITED STATES PATENT OFFICE.

THOMAS M. CRAMER, OF LONG BEACH, AND GEORGE A. CONNELL, OF WILMINGTON, CALIFORNIA, ASSIGNORS TO PACIFIC COAST BORAX COMPANY, A CORPORATION OF NEVADA.

METHOD OF TREATING FRUIT AND SOLUTION THEREFOR.

No Drawing. Application filed March 18, 1925, Serial No. 16,566. Renewed May 25, 1927.

Our present invention includes an anticryptogamic solution especially suitable for use in the treatment of citrus fruits, or the like, to check or prevent molding thereof, during storage or transportation, or in the hands of dealers or consumers; and it includes also methods of making and using the mentioned solution.

It is known that both borax and boric acid are substances capable of inhibiting the growth of molds on food products and have been used for this purpose. The immersion of citrus fruits in borax or boric acid solutions to prevent molds is a special application of this general knowledge, and no special strengths of borax or boric acid solutions are necessary to produce the inhibiting effect, although the stronger the solution used, the higher the temperature of treating solution and the longer the time of immersion of the fruit,—the less chance the molds have for development. Solubility data are submitted for information as follows:

| Degrees centigrade. | Grams anhydrous borax ($Na_2B_4O_7$) per 100 grams water. | Containing anhydrous boric acid equivalent per 100 grams water. |
|---|---|---|
| 20 | 2.6 | 1.8 |
| 30 | 4.0 | 2.8 |
| 40 | 6.3 | 4.4 |
| 50 | 10.5 | 7.3 |
| 60 | 19.4 | 13.4 |

A similar table for boric acid follows:

| Degrees centigrade. | Grams boric acid per 100 grams water. | Containing anhydrous boric acid equivalent per 100 grams water. |
|---|---|---|
| 20 | 5.04 | 2.84 |
| 30 | 6.72 | 3.79 |
| 40 | 8.72 | 4.92 |
| 50 | 11.54 | 6.51 |
| 60 | 14.81 | 8.36 |

As stated above, the mold preventative qualities of a borax or boric acid solution when used on citrus fruits are a function of
1. Time of treatment.
2. Temperature of solution.
3. Strength of solution.

The increase of any one or all three of these factors makes the treatment more effective from a mold-inhibiting standpoint; but the increase in any of these factors also increases the deleterious action of the treatment on the appearance of the skin of the fruit. There are certain limiting conditions that affect the above mentioned factors commercially.

1. *Time.*—This is limited by the size of apparatus commonly available in citrus packing houses, and also by the fact that certain deleterious results to the appearance of the fruit may come from excessive time of immersion, especially if the solutions are near the limiting heat or are two strong in borax.

2. *Temperature.*—This is limited by the resistance of the fruit. Fruit that is ripe may be especially sensitive,—55° C. would be considered an excessive temperature. 30° C. to 50° C. might be said to be the practical working temperatures, but even lower temperatures may be desirable under certain conditions. Borax action on fruit skins is also enhanced by increase in temperature.

3. *Strength of solution.*—This of course is limited by the saturation point or solubility at any given temperature. Under practical working conditions it is best to have the solutions below a "saturated strength" to avoid crystallization in case of a lowering of temperature due to unavoidable circumstances. A strength of borax equivalent to 3.1 grams anhydrous boric acid per 100 grams water has been found effective, commercially, but this is above the saturation point of the lower limit of heat named above, i. e. 30° C. It is also limited by the deleterious action on the skin of the fruit, if too strong a solution is used.

Certain conditions of time, temperature and strength of solution have been found for borax to be commercially useful, that is, mold is controlled to the extent of about 85%, as compared with untreated fruit, with the maximum allowable action of the borax on the skin of the fruit, by the use of a six minute immersion in a solution of borax equivalent to 3.1 grams anhydrous boric acid and a temperature of 42° C. It is then practically impossible to increase the effectiveness of the commercial treatment with borax, because, with an increase in any of the factors, a proportionate decrease must be made in the others, so that the fruit will not be affected in a deleterious manner.

Summing up the difficulties encountered in the practical operation of the process of treating citrus fruits with borax to prevent mold—

1. Borax has a drying effect on the skin of the orange, and this action is enhanced by the increase of (a) time of treatment, (b) temperature of borax solution, or (c) strength of solution; and these are the three factors that also add to the effectiveness of the treatment.

2. Borax solutions cannot be brought up to the full desirable strength at the lower limits of the temperature range found practical.

3. Borax causes a considerable precipitation of lime and magnesium salts when used in hard waters. This precipitation causes a loss in strength of the borax solution and is an economic waste. This precipitate may also form an insoluble scum on the treated fruit.

4. Borax solutions of a practical strength must be kept above the saturation temperature night and day or crystallization will occur, causing a clogging of pipes and circulation apparatus, and the formation of sharp crystals which, if not dissolved again, may cause damage to the tender skins of the fruit.

From the above it is seen that any other form of boric anhydride that is materially more soluble, that has less undesirable action on the skin of the fruit at a given concentration, that will not crystallize on cooling to room temperatures and has less tendency to form insoluble borates with calcium and magnesium would be a superior product for the purpose of the prevention of molds commercially on citrus fruits. Such a product can be obtained by dissolving a mixture of borax and boric acid together in water in the proper proportions. Such mixtures as are most beneficial in commercial practice we find to lie between the limits, as expressed by a molecular ratio, $$Na_2O : B_2O_3 = 1 : 10$$

and $Na_2O : B_2O_3 = 3 : 10$. Considering commercial boric acid to be $H_3BO_3$ and commercial borax to be $Na_2B_4O_7.10H_2O$ such advantageous mixtures would be obtained between the proportions

| | Pounds. |
|---|---|
| Boric acid | 72.2 |
| Borax | 27.8 |
| | 100.0 | and

| | |
|---|---|
| Boric acid | 30.2 |
| Borax | 69.8 |
| | 100.0 |

Within this range of mixture, experiment has shown the minimum of solubility of any possible mixture at 20° C. to be about 3.8 grams anhydrous boric acid per 100 grams of water, and the solubility at 30° C. to be about 6.6 grams anhydrous boric acid per 100 grams of water. The maximum solubility, within the indicated range of mixtures, at 20° C. is about 16.5 grams anhydrous boric acid per 100 grams of water, and at 30° C. is about 21.8 grams anhydrous boric acid per 100 grams of water.

The less the molecular ratio of sodium oxide to boric acid anhydride (or in other words, the greater the proportion of boric acid to borax in the mixture) the less active is the solution on the oils and waxes of the skin, and therefore, the less the deleterious "drying effect".

For a commercial application of our mixture, therefore, the exact choice of proportions depends somewhat on the physical conditions of the particular process as to size and capacity of equipment, rate of production desired and the relative market price of borax and boric acid. Four parts of boric acid to five parts of borax forms an advantageous mixture, for many uses. Due to the high solubility and deliquescent nature of the mixture, there is materially less tendency of the ingredients remaining on the surface to form a "dry dust" which makes the fruit take on a whitish appearance. The necessity of spraying the fruits with water after treatment, as is currently done after using borax, may be largely or entirely obviated. Six minutes, more or less, may be a suitable average period of treatment.

It might be inferred from the above that boric acid might have certain advantages over borax, used alone, especially regarding the action of the treating solution on the skin of the fruit. This is true, but it shares with borax the disadvantages of a relatively low solubility at the treating temperatures, and a saturation point which is below the strength desired when cooled to 20° C.,—a temperature to which solutions are likely to fall when left to stand over night without heat. It has a further disadvantage that it is an active acid, liable to attack iron; and its separate use would require, to prevent corrosion and rusting of equipment, special materials for apparatus, piping and pumps. This detrimental action is not found, with our proposed mixtures.

The desired molecular proportions of sodium oxide and boric acid in solution may be obtained in other ways than mixing borax and boric acid. For instance, caustic soda might be added to boric acid; or a stronger acid, as sulphuric or hydrochloric acid, might be added to borax.

It is now a common practice to wash oranges by carrying them through vats or tanks containing warm water, or water in which soap is dissolved, the washing being commonly followed by a brushing and rinsing. In the practice of our invention, we may introduce a suitable quantity of our described inhibiting agent into the wash water, or into the rinse water, or into both the wash water and the rinse water, so that no extra operations are required. Equivalent means and methods of wetting the fruit with the described solution, or its equivalent, might obviously be employed; and the film of solids deposited on the fruit optionally be dried thereon.

Although we have herein emphasized certain preferred methods of preparing and using our novel preservative solution, it should be understood that various features of our invention may be independently employed, and also that various additional modifications may be made, by those skilled in the art, without the slightest departure from the spirit and scope of our invention, as the same is indicated above and in the following claims.

We claim as our invention:

1. A method of treating fruit to check spoilage which comprises forming a solution containing $Na_2O$ and $B_2O_3$ in molecular ratios between 1 to 10 and 3 to 10, and wetting the fruit therewith.

2. A method as defined in claim 1 in which the treated fruit is kept wet with said solution at approximately 120° F. for a period of about 6 minutes.

3. A solution for treating fruits to prevent spoilage comprising: a product obtainable by the admixture of boric acid and borax in substantially the ratio of five parts borax to four parts boric acid.

In testimony whereof, we have hereunto set our hands at Los Angeles, California, this 11th day of March, 1925.

THOMAS M. CRAMER.
GEORGE A. CONNELL.